United States Patent
Wu et al.

(10) Patent No.: US 10,800,949 B1
(45) Date of Patent: Oct. 13, 2020

(54) DEVELOPMENT OF GRAPHENE COMPOSITE CONDUCTIVE INK FORMULATION TECHNOLOGY

(71) Applicant: National Chung-Shan Institute of Science and Technology, Taoyuan (TW)

(72) Inventors: Hsiao-Min Wu, Taoyuan (TW); Chien-Liang Chang, Taoyuan (TW); Kuei-Ting Hsu, Taoyuan (TW); Wei-Jen Liu, Taoyuan (TW); Chia-Hsin Zhang, New Taipei (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 16/372,434

(22) Filed: Apr. 2, 2019

(51) Int. Cl.
| | |
|---|---|
| *H01B 1/04* | (2006.01) |
| *C09J 9/02* | (2006.01) |
| *C09J 11/04* | (2006.01) |
| *C09J 175/08* | (2006.01) |
| *C08K 3/22* | (2006.01) |
| *C08K 3/04* | (2006.01) |
| *C08K 3/38* | (2006.01) |

(52) U.S. Cl.
CPC ............ *C09J 9/02* (2013.01); *C09J 11/04* (2013.01); *C09J 175/08* (2013.01); *H01B 1/04* (2013.01); *C08K 3/04* (2013.01); *C08K 3/042* (2017.05); *C08K 2003/2227* (2013.01); *C08K 2003/2241* (2013.01); *C08K 2003/385* (2013.01); *C08K 2201/001* (2013.01)

(58) Field of Classification Search
CPC . C09J 9/02; C09J 11/04; C09J 175/08; H01B 1/04; C08K 3/04; C08K 3/042; C08K 2003/2227; C08K 2003/385; C08K 2201/001; C08K 2003/2241

See application file for complete search history.

(56) References Cited

U.S. PATENT DOCUMENTS

| | | | | |
|---|---|---|---|---|
| 2004/0204527 | A1* | 10/2004 | Chien | .................... C09J 109/02 524/404 |
| 2011/0163275 | A1* | 7/2011 | Simmons | ........... C08G 59/5033 252/511 |

(Continued)

FOREIGN PATENT DOCUMENTS

| | | |
|---|---|---|
| JP | 5892282 B1 * | 3/2016 |
| WO | WO-2019120924 A1 * | 6/2019 ............... C08K 3/22 |

OTHER PUBLICATIONS

Miao, M. et al., Engineering of High-Performance Textiles, Woodhead Publishing, p. 315 (2018) (Year: 2018).*

*Primary Examiner* — Mark Kopec
*Assistant Examiner* — Jaison P Thomas
(74) *Attorney, Agent, or Firm* — Winston Hsu

(57) ABSTRACT

Conductive carbon adhesive is an active technology researched in the world, and its application is quite wide, such as liquid crystal display (TFTLCD), organic light emitting diode (OLED), radio frequency identification system (RFID), antenna, solar cell, sensing and electronic components for devices. Since the two-dimensional carbon material used for the conductive carbon adhesive is easily stacked and agglomerated in the polymer, the present invention adds nano-fillers to the carbon material to prepare a three-dimensional conductive carbon adhesive to prevent carbon material agglomeration.

11 Claims, 3 Drawing Sheets

Four-point probe result of different amount of titanium dioxide (TiO$_2$) added to KS44 or moKS44

(56) References Cited

U.S. PATENT DOCUMENTS

| | | | |
|---|---|---|---|
| 2012/0211160 A1* | 8/2012 | Asay | B82Y 30/00 156/324 |
| 2014/0151607 A1* | 6/2014 | Lowenthal | C09D 11/101 252/503 |
| 2016/0035456 A1* | 2/2016 | Sauro | H01B 1/24 252/511 |
| 2016/0122479 A1* | 5/2016 | Kozyuk | B29B 7/005 252/514 |
| 2019/0334179 A1* | 10/2019 | Di Noto | H01M 4/8657 |
| 2019/0353610 A1* | 11/2019 | Pandhi | G01N 27/308 |

* cited by examiner

Four-point probe result of different amount of titanium dioxide (TiO$_2$) added to KS44 or moKS44

Four-point probe result of different amount of boron nitride (BN) added to KS44 or moKS44

Four-point probe result of different amount of alumina ($Al_2O_3$) added to KS44 or moKS44

DEVELOPMENT OF GRAPHENE COMPOSITE CONDUCTIVE INK FORMULATION TECHNOLOGY

BACKGROUND OF THE INVENTION

1. Field of the Invention

The present disclosure relates to a preparation and formulation technology of a conductive carbon adhesive with a three-dimensional (3D) structure, which is added with different fillers and different percentages.

2. Description of the Prior Art

Conductive adhesive is formulated by synthetic resins, which are taken as glue, and well-conductive materials, which are taken as fillers. The conductive materials may be powders of gold, silver, copper, aluminum, zinc, iron, nickel, graphite and other conductive compounds, so as to connect the materials and form conductive paths. The conductive adhesive includes characteristics of good conductivity, good bonding and adaptive viscosity, and is widely utilized in assembly and bonding of electronic elements and components of liquid-crystal display (LCD), light-emitting diode (LED), integrated circuit (IC) chips, printed circuit board assembly (PCBA), lattice block, ceramic capacitor, membrane switch, smart card and radio frequency identification (RFID).

In electronics industry, the conductive adhesive is an indispensable material, which is classified into conductive carbon adhesive and conductive silver adhesive. Since the conductive silver adhesive is costly, the present disclosure fills nano-particle with a base of the conductive carbon adhesive to prevent stacking and agglomeration of a two-dimensional (2D) carbon material.

SUMMARY OF THE INVENTION

The present disclosure provides a three-dimensional structure of a conductive carbon adhesive by two-dimensional (2D) carbon material and nano-filler, which utilizes a small-type powder mixer to compound the 2D carbon material and the nano-filler with different percentages as conductive powder, and the conductive powder is added to a polymer for evenly stirring for 24 hours with a physical mixing method for slurry coating, which is then performed curing by putting into an oven or exposing to Ultraviolet (UV) radiation, so as to formulate the conductive adhesive with 3D structure.

The present disclosure compounds the 2D carbon materials (i.e. graphite and graphene) with alumina, boron nitride and titanium dioxide of nano-size, so as to prevent the stacking and the agglomeration of the 2D carbon material in the conductive adhesive, which effectively increases an amount of conductivity paths and improves a dispersibility of the 2D carbon material in the conductive adhesive.

These and other objectives of the present invention will no doubt become obvious to those of ordinary skill in the art after reading the following detailed description of the preferred embodiment that is illustrated in the various figures and drawings.

DETAILED DESCRIPTION

Regarding a first part, embodiments 1-4 respectively correspond to titanium dioxide added to KS44 graphite with different percentages, wherein the best percentage is 95:5, i.e. 0.082 gram (g) of the titanium dioxide added to 1.56 (g) of the KS44 graphite, which is put into a small-type powder mixer for complex and to uniformly disperse the conductive powder. Then, 50% solid content of the conductive powder is added to polymer glue for stirring for 24 hours, which is poured on a slide for coating after confirming that slurry is uniformly mixed. A thickness of the coating is around 0.1 millimeter (mm). Finally, the coating is performed curing by putting into an oven or exposing to Ultraviolet (UV) radiation, so as to prepare a conductive adhesive with a three-dimensional (3D) structure.

| Example | KS44 Graphite/Titanium dioxide (wt.%/wt.%) | sheet resistance (ohm/square) |
| --- | --- | --- |
| 1 | 100:0 | 414 ± 39.4 |

| Embodiment | KS44 Graphite/Titanium dioxide (wt.%/wt.%) | sheet resistance (ohm/square) |
| --- | --- | --- |
| 1 | 95:5 | 235 ± 47.8 |
| 2 | 90:10 | 486 ± 210.7 |
| 3 | 85:15 | $2.15 * 10^6 ± 3.5 * 10^4$ |
| 4 | 80:20 | $3.23 * 10^{37}$ |

The present disclosure prepares the graphene with a low temperature embrittlement. First, 25 (g) of KS44 graphite is weighed and added to a 500 (g) solvent, e.g. de-ionized (DI) water, a uniform suspension with 5% solid content is obtained and poured into a cycle machine the low temperature embrittlement. The low temperature embrittlement process is performed three times for each of different pressures, i.e. 800 bar, 1200 bar and 1500 bar, and then pumping filter is performed. The moKS44 graphene is obtained after being put into an oven at 40° C.

Figure 1:
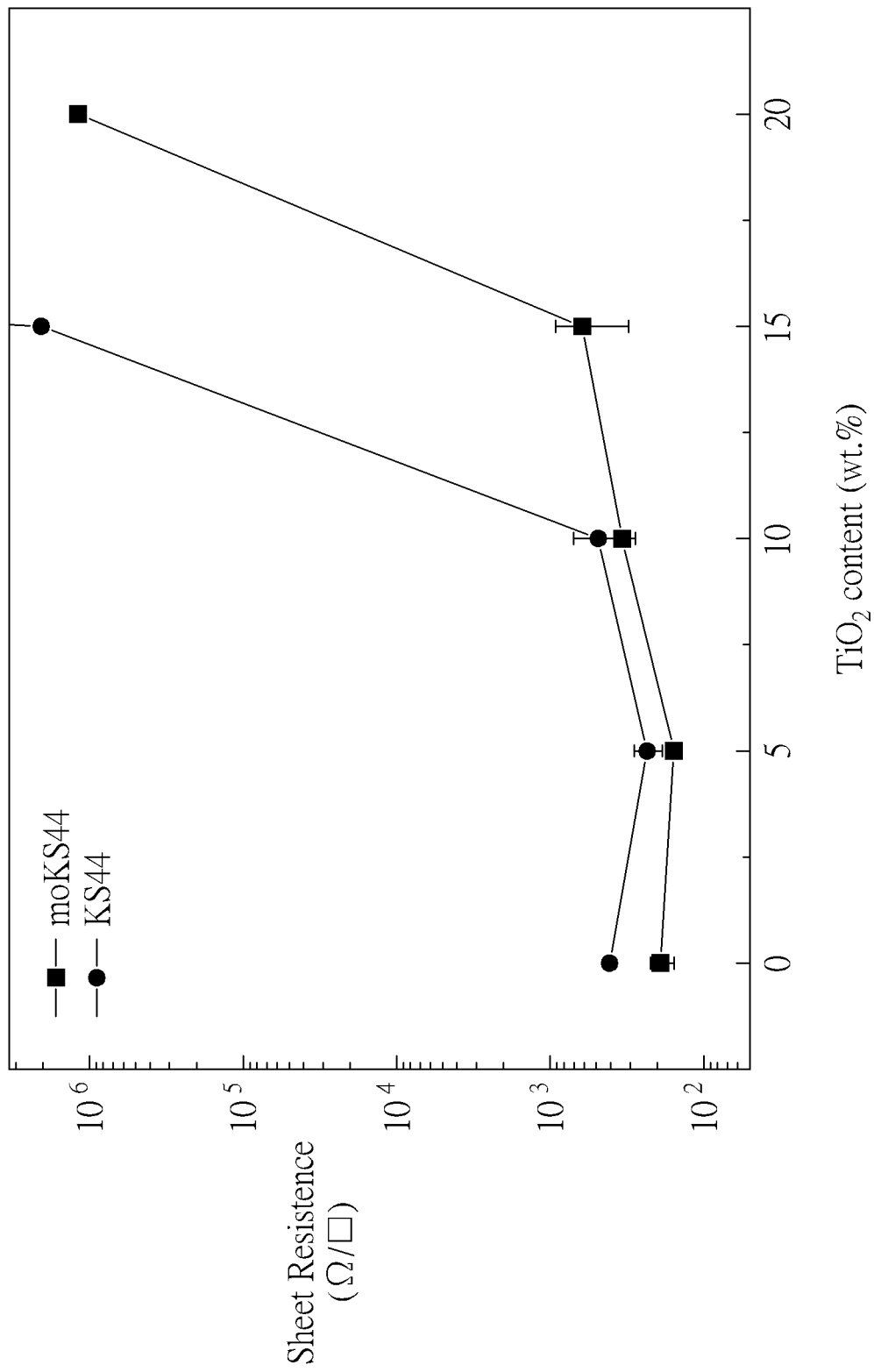
FIG. 1 is a schematic diagram of sheet resistances of conductive carbon adhesives added with different percentages of titanium dioxide ($TiO_2$).

Embodiments 5-8 respectively correspond to the titanium dioxide added to moKS44 graphene with different percentages, wherein the best percentage is 95:5, i.e. 0.029 (g) of the titanium dioxide added to 0.543 (g) of the moKS44 graphene, which is put into a small-type powder mixer for complex and to uniformly disperse the conductive powder. Then, 50% solid content of the conductive powder is added to polymer glue for stirring for 24 hours, which is poured on a slide for coating after confirming that slurry is uniformly mixed. A thickness of the coating is around 0.1 millimeter (mm). Finally, the coating is performed curing by putting into an oven or exposing to Ultraviolet (UV) radiation, so as to formulate a conductive adhesive with a 3D structure. The results of embodiments 1-4 are shown in FIG. 1.

| Example | moKS44 Graphene/Titanium dioxide (wt.%/wt.%) | Sheet resistance (ohm/square) |
| --- | --- | --- |
| 2 | 100:0 | 190 ± 33.2 |

| Embodiment | moKS44 Graphene/Titanium dioxide (wt.%/wt.%) | Sheet resistance (ohm/square) |
| --- | --- | --- |
| 5 | 95:5 | 156 ± 16.7 |
| 6 | 90:10 | 339 ± 29.4 |
| 7 | 85:15 | 622 ± 312.9 |
| 8 | 80:20 | $1.23 * 10^6 ± 7.54 * 10^4$ |

Regarding a second part, the nano-filler is replaced with boron nitride and added to the 2D carbon material with different percentages.

Embodiments 9-12 respectively correspond to the boron nitride added to KS44 graphite with different percentages, wherein the best percentage is 95:5, i.e. 0.08 (g) of the boron nitride added to 1.526 (g) of the KS44 graphite, which is put into a small-type powder mixer for complex and to uniformly disperse the conductive powder. Then, 50% solid content of the conductive powder is added to polymer glue for stirring for 24 hours, which is poured on a slide for coating after confirming that slurry is uniformly mixed. A thickness of the coating is around 0.1 millimeter (mm). Finally, the coating is performed curing by putting into an oven or exposing to Ultraviolet (UV) radiation, so as to prepare a conductive adhesive with a 3D structure.

| Example | KS44 Graphite/Boron nitride (wt.%/wt.%) | Sheet resistance (ohm/square) |
| --- | --- | --- |
| 3 | 100:0 | 414 ± 39.4 |

| Embodiment | KS44 Graphite/Boron nitride (wt.%/wt.%) | Sheet resistance (ohm/square) |
| --- | --- | --- |
| 9 | 95:5 | $1.05 * 10^4 ± 47.8$ |
| 10 | 90:10 | $2.69 * 10^6 ± 779.4$ |
| 11 | 85:15 | $3.23 * 10^{37}$ |
| 12 | 80:20 | $3.23 * 10^{37}$ |

Figure 2:
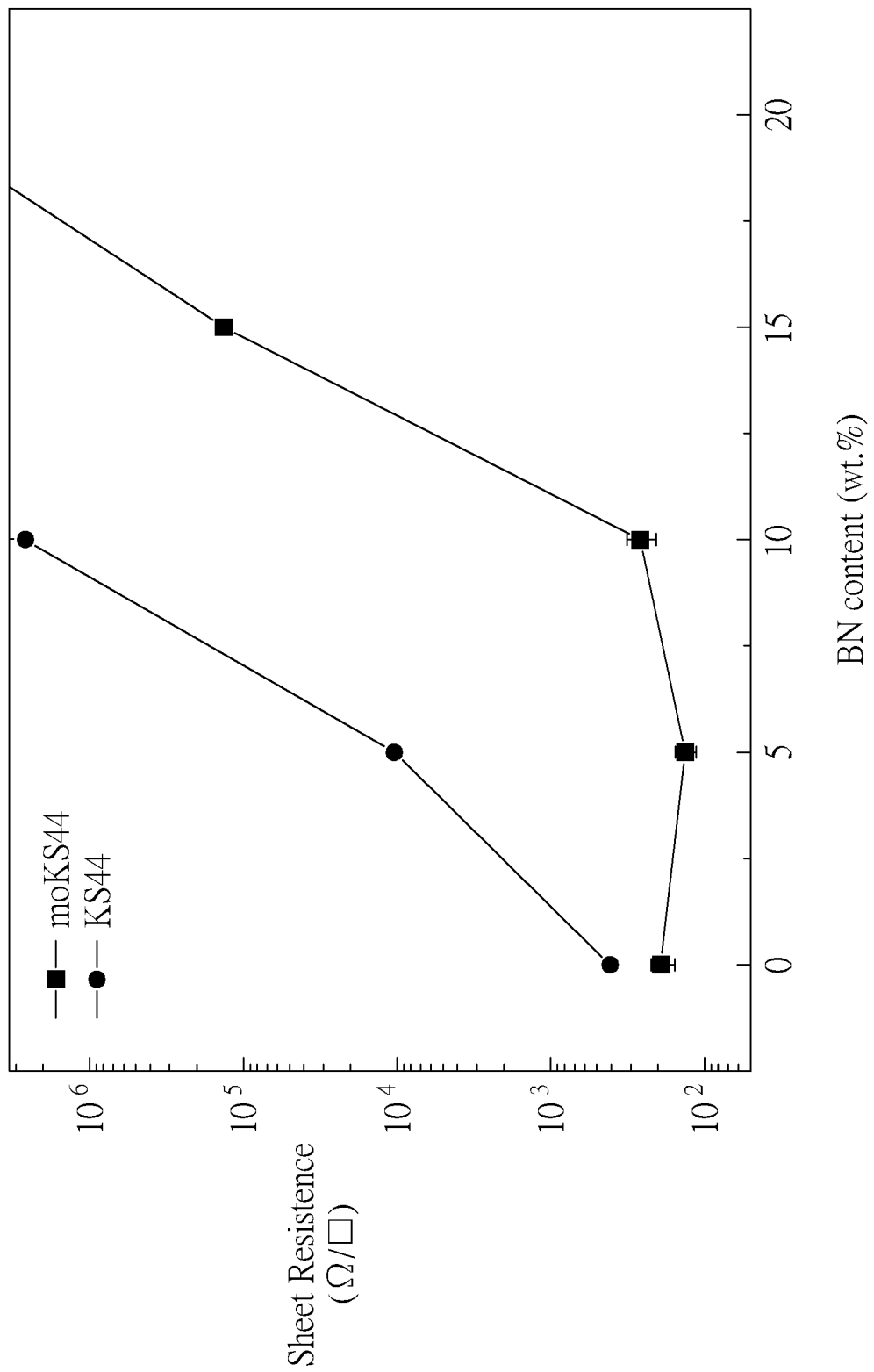
FIG. 2 is a schematic diagram of sheet resistances of conductive carbon adhesives added with different percentages of boron nitride (BN).

Embodiments 13-14 respectively correspond to the boron nitride added to moKS44 graphene with different percentages, wherein the best percentage is 95:5, i.e. 0.099 (g) of the boron nitride added to 1.893 (g) of the moKS44 graphene, which is put into a small-type powder mixer for complex and to uniformly disperse the conductive powder. Then, 50% solid content of the conductive powder is added to polymer glue for stirring for 24 hours, which is poured on a slide for coating after confirming that slurry is uniformly mixed. A thickness of the coating is around 0.1 millimeter (mm). Finally, the coating is performed curing by putting into an oven or exposing to Ultraviolet (UV) radiation, so as to prepare a conductive adhesive with a 3D structure. The results are shown in FIG. 2.

| Example | moKS44 Graphene/Boron nitride (wt.%/wt.%) | Sheet resistance (ohm/square) |
| --- | --- | --- |
| 4 | 100:0 | 190 ± 33.2 |

| Embodiment | moKS44 Graphene/Boron nitride (wt.%/wt.%) | Sheet resistance (ohm/square) |
| --- | --- | --- |
| 13 | 95:5 | 135 ± 19.77 |
| 14 | 90:10 | 262 ± 57.02 |
| 15 | 85:15 | $1.37 * 10^5 ± 2.29 * 10^3$ |
| 16 | 80:20 | $1.72 * 10^7 ± 4.5 * 10^5$ |

Regarding a third part, the nano-filler is replaced with alumina and added to the 2D carbon material with different percentages.

Embodiments 17-20 respectively correspond to the alumina added to KS44 graphite with different percentages, wherein the best percentage is 95:5, i.e. 0.08 (g) of the alumina added to 1.526 (g) of the KS44 graphite, which is put into a small-type powder mixer for complex and to uniformly disperse the conductive powder. Then, 50% solid content of the conductive powder is added to polymer glue for stirring for 24 hours, which is poured on a slide for coating after confirming that slurry is uniformly mixed. A thickness of the coating is around 0.1 millimeter (mm). Finally, the coating is performed curing by putting into an oven or exposing to Ultraviolet (UV) radiation, so as to prepare a conductive adhesive with a 3D structure.

| Example | KS44 Graphite/Alumina (wt.%/wt.%) | Sheet resistance (ohm/square) |
| --- | --- | --- |
| 5 | 100:0 | 414 ± 39.4 |

| Embodiment | K544 Graphite/Alumina (wt.%/wt.%) | Sheet resistance (ohm/square) |
| --- | --- | --- |
| 17 | 95:5 | 626 ± 65.9 |
| 18 | 90:10 | $1.64 * 10^5 ± 779.4$ |
| 19 | 85:15 | $8.588 * 10^5 ± 2.55 * 10^4$ |
| 20 | 80:20 | $1.49 * 10^6 ± 2.49 * 10^5$ |

Figure 3:
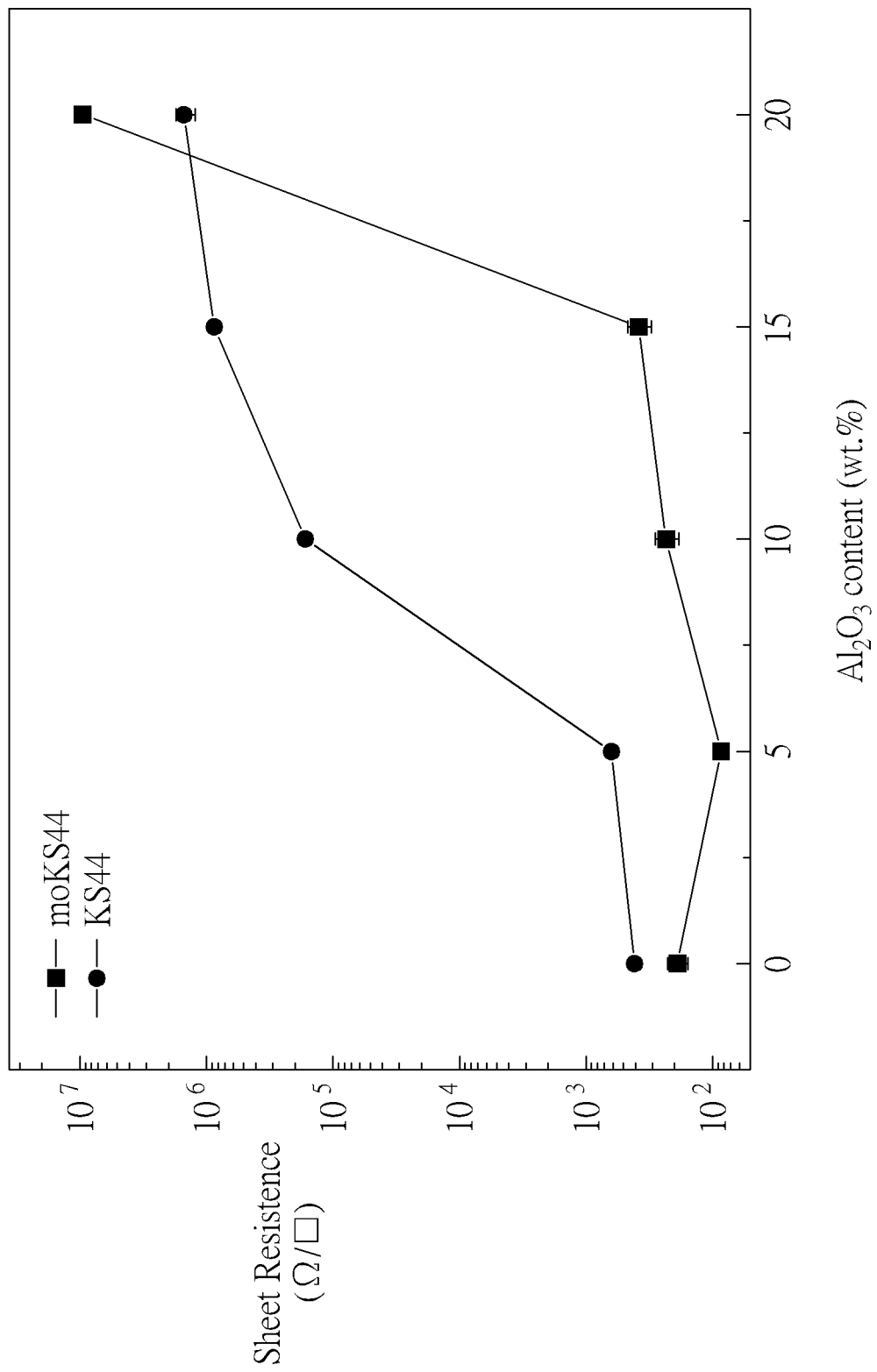
FIG. 3 is a schematic diagram of sheet resistances of conductive carbon adhesives added with different percentages of alumina ($Al_2O_3$).

Embodiments 21-28 respectively correspond to the alumina added to moKS44 graphene with different percentages, wherein the best percentage is 98:2, i.e. 0.022 (g) of the alumina added to 2.159 (g) of the moKS44 graphene, which is put into a small-type powder mixer for complex and to uniformly disperse the conductive powder. Then, 50% solid content of the conductive powder is added to polymer glue for stirring for 24 hours, which is poured on a slide for coating after confirming that slurry is uniformly mixed. A thickness of the coating is around 0.1 millimeter (mm). Finally, the coating is performed curing by putting into an oven or exposing to Ultraviolet (UV) radiation, so as to prepare a conductive adhesive with a 3D structure. The results are shown in FIG. 3.

| Example | moKS44 Graphene/Alumina (wt.%/wt.%) | Sheet resistance (ohm/square) |
| --- | --- | --- |
| 6 | 100:0 | 190 ± 33.2 |

| Embodiment | moKS44 Graphene/Alumina (wt.%/wt.%) | Sheet resistance (ohm/square) |
| --- | --- | --- |
| 21 | 99:1 | 111 ± 24.88 |
| 22 | 98:2 | 79.3 ± 4.7 |
| 23 | 97:3 | 87.8 ± 2.86 |
| 24 | 96:4 | 114 ± 9.67 |
| 25 | 95:5 | 85.7 ± 10.72 |
| 26 | 90:10 | 232 ± 49.42 |
| 27 | 85:15 | 383 ± 81.05 |
| 28 | 80:20 | $9.45 * 10^6 ± 1.8 * 10^5$ |

As can be found from the embodiments above, the lowest sheet resistance exists when the alumina is added to the moKS44 graphene. Therefore, the solid content of the present disclosure is improved from 50% to 60% and the measured sheet resistance is decreased obviously, as shown in embodiments 29-31.

| Embodiment | solid content of moKS44(%) | Sheet resistance (ohm/square) |
|---|---|---|
| 29 | 50% | 85.7 ± 10.72 |
| 30 | 55% | 61.5 ± 1.04 |
| 31 | 60% | 51.8 ± 0.72 |

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A formulation method of a conductive carbon adhesive with a three-dimensional (3D) structure comprising:
    adding nano-filler to a carbon material; and
    performing a light curing or a heating curing on the carbon material with polymer;
    wherein the nano-filler is titanium dioxide;
    wherein the carbon material is with a two-dimensional (2D) structure.

2. The formulation method of claim 1, wherein the nano-filler is titanium dioxide and boron nitride, alumina or a combination thereof.

3. The formulation method of claim 1, wherein a main body of the carbon material is graphite or graphene.

4. The formulation method of claim 3, wherein a solid content of the graphene or the nano-filler added to the polymer is between 1 and 80 wt. %.

5. The formulation method of claim 1, wherein the polymer comprises a first monomer of isocyanate group and a second polyol monomer with two hydroxyl groups.

6. The formulation method of claim 5, wherein a molecular weight of the glycol is between 500 and 4000.

7. The formulation method of claim 5, wherein an organic solvent for the polymer is isopropanol, ethanol, ethyl acetate, acetone or a combination thereof.

8. The formulation method of claim 1, wherein a ratio of the carbon material with the two-dimensional (2D) structure and the nano-filler is between 100:0-80:20 wt. %.

9. The formulation method of claim 1, wherein a reaction temperature of the formulation method is between 100° C. and 200° C.

10. The formulation method of claim 1, wherein a curing time of the formulation method is between 30 minutes and 12 hours.

11. The formulation method of claim 1, wherein a physical mixing time of the formulation method is between 1 and 2 days.

* * * * *